Sept. 26, 1939.  H. E. IVES  2,174,003
OPTICAL DEVICE
Filed Nov. 29, 1935
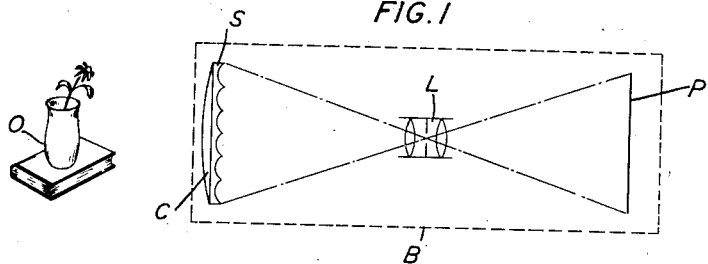
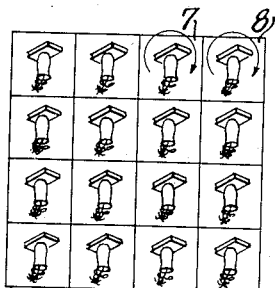
ORIENTATION OF LIPPMANN PICTURES
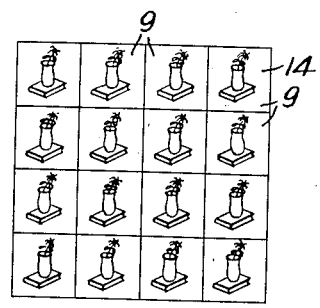
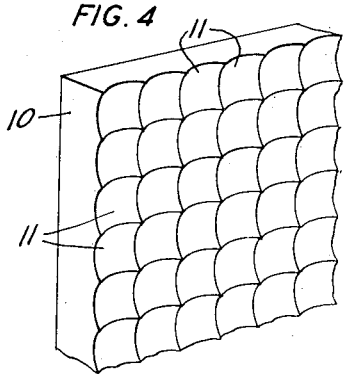
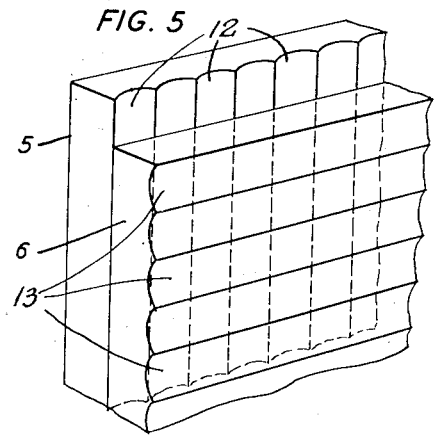
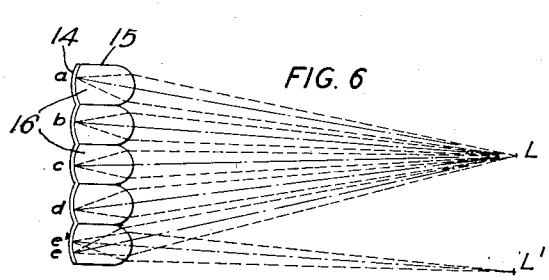
INVENTOR
H. E. IVES
BY
Stanley B. Kent.
ATTORNEY Patented Sept. 26, 1939

2,174,003

UNITED STATES PATENT OFFICE 2,173,003

OPTICAL DEVICE

Herbert E. Ives, Montclair, N. J., assignor to Bell Telephone Laboratories, Incorporated, New York, N. Y., a corporation of New York Application November 29, 1935, Serial No. 52,156

5 Claims. (Cl. 95—18)

This invention relates to an optical device for producing pictures visible in stereoscopic relief.

The pictures produced are of the type of the Lippmann integral photograph. The optical properties of this type of picture are set forth in considerable detail in a paper by Herbert E. Ives entitled "Optical properties of a Lippmann lenticulated sheet", and published in the Journal of the Optical Society of America, vol. 21, pages 171 to 176 for March, 1931. In this type of picture there is a complete image of the field of view for each elemental area of the picture. In the Lippmann picture the photographic emulsion carrier consists of a large number of convex lenses, one for each elemental area of the picture, the rear surface of each lens being of such curvature that the image formed due to the front curvature is sharp at all points. The emulsion is carried by the rear surface. The Lippmann negative is produced by simply setting up the grating of lenses before the field of view, due care being taken to exclude unwanted light and to allow proper time of exposure of the emulsion to the image forming light. The positive is produced by a reversal process. This positive picture is then viewed through the lenses af the emulsion carrier.

A defect of such a Lippmann picture is that the picture exhibits pseudoscopic relief instead of stereoscopic relief.

An object of this invention is to provide a device for producing pictures of the Lippmann type which exhibit stereoscopic relief.

In an example of practice illustrative of the invention there is provided a camera which comprises a grating of concave lenses, a high-grade photographic lens which images the grating of concave lenses accurately on the emulsion on the rear surface of a Lippmann grating, and a deviating lens placed in close contact with the grating of concave lenses of such focal length that the principal focus coincides with the optical center of the photographic lens. A suitable light excluding casing and shutter is provided to exclude unwanted light and to properly control the time of exposure of the emulsion.

Alternately, the grating of concave lenses may comprise two transparent sheets, each having a set of parallel concave cylindrical grooves on one surface and the sheets lying back to face with the grooves of one sheet at right angles to those of the other. Furthermore, the Lippmann grating may be replaced with a plane emulsion carrier to be used later for contact or projection printing on a Lippmann grating.

Other modifications will be obvious to those skilled in the art of optics.

The invention will now be described in more detail by reference to the accompanying drawing.

Fig. 1 illustrates schematically an optical device according to the present invention arranged to take a picture of a three-dimensional object group;

Fig. 2 illustrates the orientation of the images of a Lippmann picture when viewed from the emulsion side;

Fig. 3 illustrates the orientation of the virtual images formed by the grating of concave lenses of the present invention when viewed from the position of the objective lens of Fig. 1;

Fig. 4 illustrates a form of grating having concave spherical lenses formed on one surface of a transparent sheet;

Fig. 5 illustrates an alternative form of grating comprising two transparent sheets with parallel concave cylindrical grooves; and Fig. 6 illustrates a Lippmann grating on the rear (left-hand side) of which are the pictures according to the present invention.

The arrangement for making appropriate negatives is shown in Fig. 1. The object O is set up in front of the multi-lens screen S, which may be of the form shown either in Fig. 4 or Fig. 5. The photographic lens L of exquisite defining power and freedom from distortion is adapted to form an image of the screen S on the sensitive plate P. An additional large condensing lens C in contact with the lenticular screen S and of focal length equal to the distance from screen S to lens L insures that the virtual images of the object O formed by each of the small concave lenses on screen S are photographed on the sensitive plate P as though each little lens were viewed along its axis. The photographic operation then consists of a simple single exposure as with an ordinary camera.

The light excluding casing is represented by the dotted line box B.

Referring now to Fig. 2, there is illustrated the appearance of the Lippmann lenticulated sheet when exposed to the object O. On the rear surface of each convex lens is an inverted image of the object. Considering any pair of these images such as images 7 and 8 in the upper right-hand corner, the necessary inverting operation such that these, while preserving their proper places on the sheet, shall yet be properly oriented to produce stereoscopic relief, is indicated by the arrows, an operation which cannot be performed by any inversion of the sheet as a whole.

In the case of the concave lenticulated element S shown in Fig. 1, the appearance of the sheet 14 when exposed to the object O and viewed from the position of the lens L is as illustrated in Fig. 3. Each small vertical image 9 is correctly oriented and placed for producing an image in stereoscopic relief.

It is needless to describe in detail how a virtual image of the object O is formed in front of each concave lens of the screen S which can be photographed by the lens L in view of the well-known action and properties of concave lenses.

The grating shown in Fig. 4 consists of a sheet 10 of transparent material such as celluloid or glass on one surface of which are a larger number of spherical indentations 11. Each indentation corresponds to an elemental area of the picture and the number required depends upon the degree of resolution desired. The small numbers shown in the drawing are merely for the sake of simplicity. Each indentation has such a radius of curvature that a suitable virtual image is formed in the vicinity of each surface.

An alternative form of grating is illustrated in Fig. 5. In some respects it is preferred to the form illustrated in Fig. 4 since it is easier to construct. It consists of two transparent sheets 5 and 6, which are provided with sets of concave cylindrical grooves 12 and 13, respectively, all of the axes of a given set being parallel and lying in the same plane. The grooved surface of sheet 5, for example, is placed adjacent to the plane surface of sheet 6 but the grooves of sheet 5 are at right angles to those of sheet 6. It is quite practical and feasible to form these grooves by grinding with a rotating ball, similar to a dentist's tool. The grooves may also be formed in Celluloid sheets by wrapping the sheets about a large drum on a lathe and passing them under a milling cutter of proper shape, subsequently polishing with a rapidly-rotating felt-covered wire. A practical form of screen consists of two such sheets, each ten inches by twelve inches in size, having sixteen grooves to the inch. When such sheets are placed against each other with their grooves at right angles, as shown in Fig. 5, they form a screen having a ten inch square area containing the equivalent of some 25,600 small concave lenses. When such a screen is examined with a magnifying lens, each little square element shows a clear minute image of the scene in front of it.

The optical properties of the Lippmann emulsion carrier are illustrated in Fig. 6. Each spherical lens element has a front (right-hand) and rear (left-hand) curvature such that an image of a plane passing through the point L and parallel to a plane passing through the centers of the lenses is formed sharply on the rear surfaces. Thus, different points relatively, $a$, $b$, $c$, $d$ and $e$ of each surface would be seen from the point L. Further, two separated points $e$ and $e'$, for example, on each rear surface would be seen from two separated points of observation such as L and L', corresponding, for example, to the two eyes of an observer.

When the photograph 14 of the present invention, produced by the optical device of Fig. 1 in the form illustrated in Fig. 3, is carried on the rear surface of the Lippmann grating 15 of Fig. 6 in proper registry with the lenses 16 thereof, a different composite image is seen from each point of observation. Thus, an observer looking at such a picture with both eyes will see a picture in stereoscopic relief.

As indicated hereinbefore the number of lenticular elements shown in the drawing are made smaller than the number which are used in actual practice. The degree of resolution desired and the quality of the optical and photographic elements used determines the number.

The viewing screen may be made up of two ridged transparent sheets with the ridges of one sheet at right angles to those of the other. Two ridged glass plates of a form produced for ophthalmological testing apparatus may be used. These sheets are ground with convex ridges approximately one-tenth inch wide. The multi-convex lens structure thus produced is, of course, equivalent to a sheet with lenticular surfaces only on the front face and is consequently not adapted to a wide viewing angle. The preferred form is that shown in Fig. 6 but the ridged structure just described has the advantage of availability in the open market.

The photographs produced by the apparatus of Fig. 1 may also be viewed through a pin-hole screen wherein there is a pin-hole for each concave lenticular element of the taking device. Such a screen may be produced by the simple procedure of photographing a distant point source of light by the apparatus shown in Fig. 1. A positive from the negative so obtained is then placed over a print from the negative of the object O with an appropriate separation. The resulting integral picture seen with such a screen is, relatively speaking, opaque and of poor quality. Nevertheless, it is a picture visible in stereoscopic relief.

What is claimed is:

1. An optical device comprising a sheet of transparent material having concave cylindrical grooves on one surface, a second sheet of transparent material also having concave cylindrical grooves on one surface and positioned face to face with said first sheet with the two sets of grooves at right angles to one another, said two sheets being adapted to form a plurality of two-dimensional virtual images of an object positioned in front of said sheets, one image for each crossing of two grooves, said virtual images being of approximately equal dimensions in the two directions and an objective lens so positioned as to form an image of said sheets and virtual images on a light sensitive surface.

2. An optical device comprising a plurality of concave lenticular elements forming a grating, each lenticular element being adapted to form a two-dimensional virtual image of an object positioned in front of said grating, said virtual images being of approximately equal dimensions in the two directions, an objective lens so positioned as to form an image of said grating and said virtual images on a photographic emulsion, and a converging lens adjacent to said grating of such focal length that its principal focus coincides with said objective lens.

3. An optical device comprising a plurality of lenses arranged to form a corresponding number of two-dimensional virtual images of an object from a corresponding number of points of view around the object, a grating of convex lenses, and means to photograph said virtual images on an emulsion carried by one set of surfaces of said convex lenses in registry with said lenses which emulsion carrying set of surfaces is optically nearer to said plurality of lenses.

4. An optical system comprising a multi-lens screen, the lenses of said screen being concave spherical lenses of substantially equal strength, means to position said screen in front of an object to be photographed, a photographic lens of exquisite defining power and freedom from distortion positioned to form an image of said screen on a sensitive photographic plate, and a large condensing lens in contact with said screen of focal length equal to the distance from said screen to said photographic lens, whereby virtual images of the object formed by each of the concave lenses are photographed on the sensitive plate as though each concave lens were viewed along its axis.

5. An optical system comprising a screen composed of two adjacent transparent sheets having an array of parallel concave cylindrical grooves on one face of each sheet, the grooves on one sheet being at right angles to those on the other, a photographic lens of exquisite defining power and freedom from distortion positioned to form an image of said screen on a sensitive photographic plate, and a large condensing lens in contact with said screen of focal length equal to the distance from said screen to said photographic lens.

HERBERT E. IVES.